(12) United States Patent
Brockway et al.

(10) Patent No.: US 7,720,906 B2
(45) Date of Patent: May 18, 2010

(54) WEB SERVICE FOR REMOTE APPLICATION DISCOVERY

(75) Inventors: Tad Dennis Brockway, Redmond, WA (US); Robert K. Leitman, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 10/721,514

(22) Filed: Nov. 24, 2003

(65) Prior Publication Data

US 2005/0125560 A1 Jun. 9, 2005

(51) Int. Cl.
*G06F 15/16* (2006.01)
*G06F 3/00* (2006.01)

(52) U.S. Cl. ..................... 709/203; 715/740
(58) Field of Classification Search ............... 709/203, 709/219, 249; 715/740, 760
See application file for complete search history.

(56) References Cited

U.S. PATENT DOCUMENTS

| | | | |
|---|---|---|---|
| 5,838,916 A | 11/1998 | Domenikos et al. | |
| 5,845,081 A | 12/1998 | Rangarajan et al. | 709/224 |
| 5,845,267 A | 12/1998 | Ronen | |
| 5,903,905 A | 5/1999 | Andersen et al. | |
| 6,131,120 A | 10/2000 | Reid | |
| 6,160,551 A | 12/2000 | Naughton et al. | |
| 6,247,052 B1 | 6/2001 | Huang et al. | 709/224 |
| 6,263,363 B1 | 7/2001 | Rosenblatt et al. | |
| 6,279,001 B1 | 8/2001 | DeBettencourt et al. | |
| 6,356,933 B2 * | 3/2002 | Mitchell et al. | 709/203 |
| 6,640,302 B1 | 10/2003 | Subramaniam et al. | |
| 6,654,784 B1 | 11/2003 | Wei | |
| 6,760,748 B1 | 7/2004 | Hakim | |
| 6,826,606 B2 | 11/2004 | Freeman et al. | |
| 6,836,786 B1 | 12/2004 | Zoller et al. | |
| 6,836,885 B1 | 12/2004 | Buswell et al. | |
| 6,898,618 B1 | 5/2005 | Slaughter et al. | |
| 6,968,500 B2 | 11/2005 | Mikhailov et al. | |
| 6,970,869 B1 | 11/2005 | Slaughter et al. | |
| 6,990,513 B2 | 1/2006 | Belfiore et al. | |
| 6,999,912 B2 | 2/2006 | Loisey et al. | |
| 7,047,177 B1 | 5/2006 | Lee et al. | |
| 7,072,936 B2 | 7/2006 | Sturtevant et al. | |

(Continued)

FOREIGN PATENT DOCUMENTS

JP 10105482(A) 4/1998

(Continued)

OTHER PUBLICATIONS

GraphOn Corporation. "Go-Global® UX Administrator's Guide", Version 2.0.3, Mar. 2002, 49 pages.*

(Continued)

*Primary Examiner*—George C Neurauter, Jr.
(74) *Attorney, Agent, or Firm*—Lee & Hayes, PLLC

(57) ABSTRACT

Systems and methods of a Web service for remote terminal service application discovery are described. In one aspect, a Web service in an Intranet is provided. The Web service is coupled to a public network. The Web service facilitates remote client computer discovery over the public network of information corresponding to application(s) deployed on the Intranet. The remote client computer is external to the Intranet. The application(s) are configured for terminal server based access for a user of the remote client computer.

23 Claims, 5 Drawing Sheets

U.S. PATENT DOCUMENTS

| | | | |
|---|---|---|---|
| 7,080,092 B2 | 7/2006 | Upton | |
| 7,117,504 B2 | 10/2006 | Smith et al. | |
| 7,139,551 B2 * | 11/2006 | Jamadagni | 455/412.1 |
| 7,146,420 B2 * | 12/2006 | Dahlman et al. | 709/225 |
| 7,155,455 B2 * | 12/2006 | Clendenin | 707/104.1 |
| 7,191,217 B2 * | 3/2007 | Tanabe et al. | 709/205 |
| 7,210,143 B2 | 4/2007 | Or et al. | |
| 7,240,109 B2 | 7/2007 | Wookey et al. | |
| 7,296,022 B2 | 11/2007 | Harjanto | |
| 2001/0047385 A1 | 11/2001 | Tuatini | |
| 2002/0040434 A1 | 4/2002 | Elliston et al. | |
| 2002/0054090 A1 | 5/2002 | Silva et al. | |
| 2002/0059425 A1 | 5/2002 | Belfiore et al. | |
| 2002/0062361 A1 | 5/2002 | Kivipuro et al. | |
| 2002/0116454 A1 | 8/2002 | Dyla et al. | |
| 2002/0124082 A1 | 9/2002 | San Andres et al. | |
| 2002/0143819 A1 | 10/2002 | Han et al. | |
| 2002/0174010 A1 | 11/2002 | Rice, III | |
| 2003/0009385 A1 | 1/2003 | Tucciarone et al. | |
| 2003/0014476 A1 | 1/2003 | Peterson | |
| 2003/0018725 A1 | 1/2003 | Turner et al. | |
| 2003/0065943 A1 | 4/2003 | Geis et al. | |
| 2003/0115263 A1 | 6/2003 | Tran et al. | |
| 2003/0135628 A1 | 7/2003 | Fletcher et al. | |
| 2003/0149728 A1 * | 8/2003 | Wewalaarachchi et al. | 709/206 |
| 2003/0182392 A1 * | 9/2003 | Kramer | 709/217 |
| 2003/0191590 A1 | 10/2003 | Narayan et al. | |
| 2003/0195932 A1 * | 10/2003 | Tanabe et al. | 709/205 |
| 2003/0217166 A1 | 11/2003 | Dal Canto | |
| 2004/0088377 A1 | 5/2004 | Henriquez | |
| 2004/0103320 A1 | 5/2004 | Storer et al. | |
| 2004/0177073 A1 | 9/2004 | Snyder et al. | |
| 2004/0255289 A1 * | 12/2004 | Alex George et al. | 717/174 |
| 2005/0027784 A1 | 2/2005 | Fusari | |
| 2005/0102173 A1 | 5/2005 | Barker et al. | |
| 2005/0125529 A1 | 6/2005 | Brockway et al. | |
| 2005/0125560 A1 * | 6/2005 | Brockway et al. | 709/249 |
| 2005/0234873 A1 * | 10/2005 | Milligan et al. | 707/3 |
| 2006/0031163 A1 | 2/2006 | Kivipuro et al. | |

FOREIGN PATENT DOCUMENTS

| | | |
|---|---|---|
| JP | 2002300184(A) | 10/2002 |
| JP | 2003173224(A) | 6/2003 |
| RU | 2188450 C2 | 8/2002 |
| RU | 2190253 C2 | 9/2002 |
| RU | 2193823 C2 | 11/2002 |
| RU | 2204166 C2 | 5/2003 |

OTHER PUBLICATIONS

Pascoe, Robert, "Salutation Architecture: Enabling Applications and Services", Aug. 19, 1998, Salutation Consortium, 11 pages.

International Search Report completed Mar. 20, 2006; mailed Jun. 21, 2006, from counterpart PCT patent application, International Application No. PCT/US2004/023607, International Filing Date Jul. 22, 2004, copy attached, 3 pages.

* cited by examiner

WEB SERVICE FOR REMOTE APPLICATION DISCOVERY

TECHNICAL FIELD

The invention pertains to remote terminal service application discovery.

BACKGROUND

Traditionally, application publishing involves installing and running a published application on a local machine. This may be performed by an administrator publishing packages that are subsequently downloaded and installed on administrator specified client machines. Depending on the application software, the hardware requirements for such a machine (the client) may be high. In addition, the installation itself may take significant amount of time, resources, and may even conflict with existing application installations.

In view of such conventional application publishing limitations, terminal services may be used in distributed computing environments to provide a thin client computing model to resources installed and executed in a corporate intranet. Using terminal services (TSs) allows a remote computing device (i.e., a client device that is outside of the intranet) to access an application installed on a corporate server, execute the application on the corporate server, and display the applications' user interface (UI) on the remote client. Since the application is executed on the corporate server, TSs allow the remote client to take advantage of corporate infrastructure resources independent of whether the remote client has appropriate hardware and software to execute the resources locally on the client device.

An administrative entity, to configure a corporate intranet for specific user, groups of users, and/or client device access to an application, typically must install the application and specify explicit application access policies and default/customized application behaviors. Since these corporate-end preparations are performed in advance of end-user access to the resources, these preparations generally do not negatively affect the final application use experience of the remote client user. Yet, even in view of such corporate-end preparations, the remote client user must still undertake substantially labor intensive and time consuming procedures to determine what applications have been authorized for user access, remotely access, and then execute the application(s) installed in a corporate intranet via TSs.

For instance, today a user must set up a Virtual Private Network (VPN) connection to the corporate network, start a remote client, enter the name of the remote computer and the user's credentials, then use TSs to connect to a desktop, and start applications from that desktop. To make matters worse, these end-user activities must be performed by the consumer each and every time that the user desires to remotely access the applications via TS services.

In view of these substantially labor intensive and time consuming procedures that the remote client user typically needs to undertake to identify available applications on a private network for subsequent remote TS execution, the remote client user cannot seamlessly identify available corporate resources for TS access.

SUMMARY

Systems and methods of a Web service for remote terminal service application discovery are described. In one aspect, a Web service in an Intranet is provided. The Web service is coupled to a public network. The Web service facilitates remote client computer discovery over the public network of information corresponding to application(s) deployed on the Intranet. The remote client computer is external to the Intranet. The application(s) are configured for terminal server based access for a user of the remote client computer.

BRIEF DESCRIPTION OF THE DRAWINGS

In the figures, the left-most digit of a component reference number identifies the particular figure in which the component first appears.

DETAILED DESCRIPTION

Overview

Figure 1:
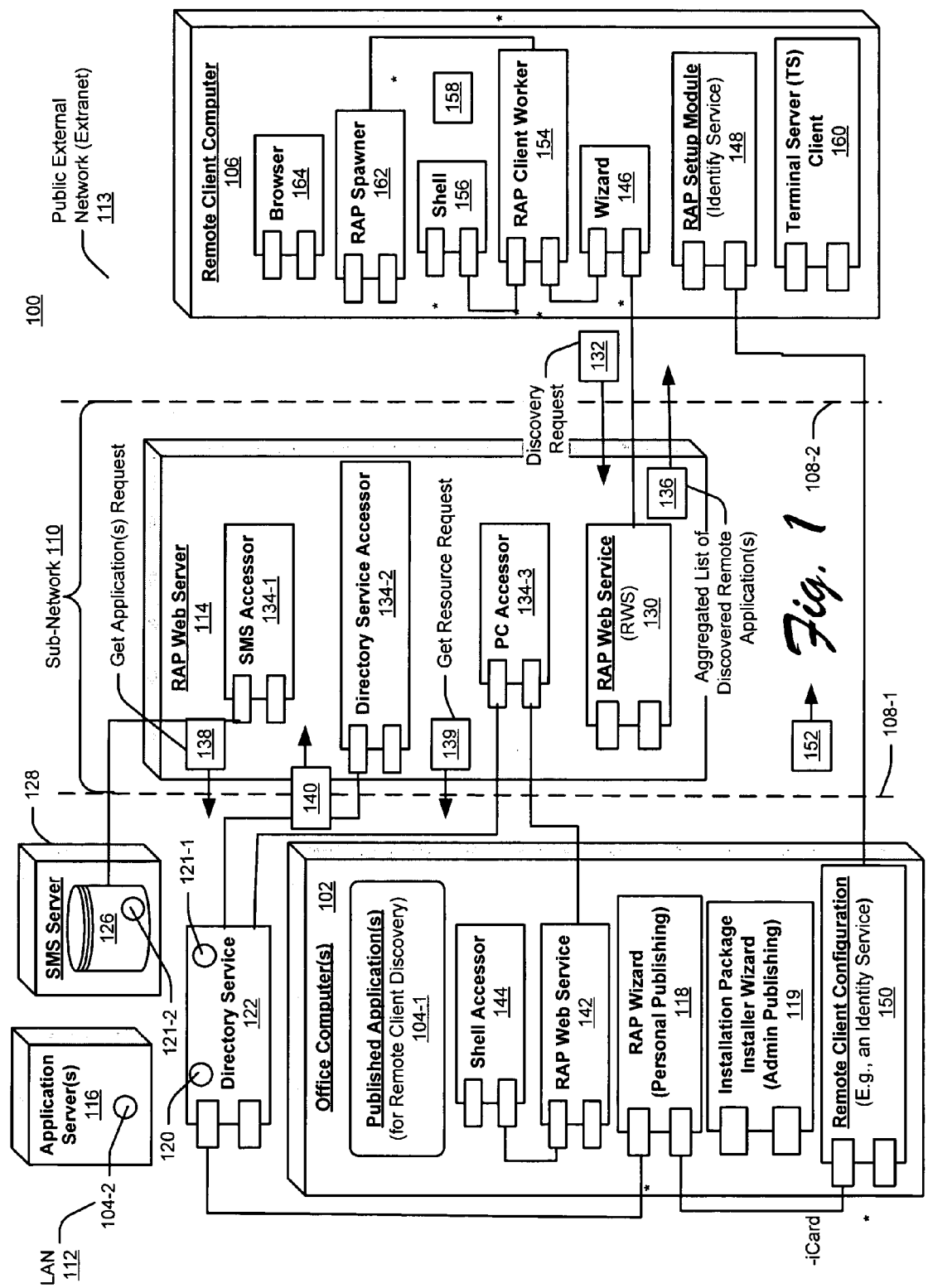
FIG. 1 illustrates an example of a suitable computing environment on which the subsequently described systems, apparatuses and methods for a Web Service for remote application discovery may be fully or partially implemented.

The following described systems and methods for a Web Service for remote application discovery substantially simplify a remote client's experience when accessing applications for terminal service execution by a server on an organizational intranet. One reason for this simplified access is because the systems and methods discover applications that have been configured for remote access across any number of corporate intranet application installation points. To this end, the systems and methods allow an organizational entity to publish remote applications using a variety of information source mechanisms and then provide a single aggregated view of the applications to remote clients over the Internet. Such application publishing is referred to as Remote Application Publishing (RAP). Remote client computer device discovery of applications that have been published via RAP for access by a user, group of users, and/or a specific computing device is referred to as remote application discovery.

More specifically, an entity in an organizational intranet installs, or deploys some number of applications on servers and/or end-user computing devices in the corporate intranet. For instance, an administrative entity may install an application on a corporate server for remote TS-based access. The administrative entity uses RAP to create associations between the deployed/applications and specific user(s), group(s) of users, and/or specific client computing device(s). These associations are then stored in one or more databases/information sources. Such databases include, for example, Systems Management Server (SMS) and/or a directory service (databases). In another example, a user of a computer (e.g., a general purpose computer, workstation, etc,) in the intranet uses RAP to specify that an application deployed on the computer is to be available for remote TS-based access by the user.

A remote client device, independent of whether it is outside of the corporate firewall, connected to the corporate network over a Virtual Private Network (VPN), and/or so on, discovers these applications via a novel RAP Web Service (RWS) deployed on a public network such as the Internet. In one implementation, an end-user of the remote client device uses a Web browser or user interface shell to discover/enumerate each application associated with the remote client device or the end-user. Responsive to receiving the RAP discovery request, the RWS queries the databases to identify each application associated with the remote client device or a single user associated with the remote client device. RWS hides the details of the protocols for communicating with each of the different databases being queried for applications.

After identifying one or more applications configured for remote client TS-based access by the user, and independent of the number and types of installation points associated with the applications, the RWS aggregates each identified application and its intranet installation point into a single comprehensive list of applications. The aggregated list is sent to the requesting remote client device for presentation, for instance, as shortcuts in a user interface (UI) shell, a Web browser window, and/or so on. Since the presented shortcuts represent an aggregate of the remotely deployed applications over one or more application sources, it is completely transparent to the end-user whether the RAP shortcuts are coming from a single source (installation point) or from multiple disparate information sources. In this manner, authorized users may seamlessly discover and use applications deployed on terminal server (TS) farms and/or on their office computer from a remote location. By presenting such shortcuts via UI shell improvements, the end user is provided with seamless TS-based access to corporate resources deployed across any number of remote servers and/or desktops.

These and other aspects of the systems and methods for a Web Service for remote application discovery are now described in greater detail.

An Exemplary System for Remote Application Discovery

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

Installing Applications on an Organizational Intranet for Remote Discovery

FIG. 1 illustrates an example of a suitable computing environment 100 on which the subsequently described systems, apparatuses and methods for a Web Service for remote application discovery may be fully or partially implemented. Environment 100 includes a general purpose computing device in the form of an office computer 102 for associating application(s) 104 (e.g., 104-1 and 104-2) with a specific user(s), group(s) of users, and/or remote client computing device(s) 106. The office computer is behind a corporate firewall 108-1 in an intranet. In this implementation, the intranet includes sub-network 110 that sits between a trusted internal network—LAN 112—and an untrusted external network 113 such as the Internet. Sub-network 110 is a demilitarized zone (DMZ) delineated by firewalls 108-1 and 108-2. Sub-network 110 includes RAP Web server 114 for aggregating terminal services remote application information/shortcuts from multiple sources so that they can be enumerated by a user of a remote client device 106 over the Internet.

Application(s) 104 are deployed and published on one or more installation points of the LAN 112. For example, applications 104-1 have been published on one or more office computer(s) 102, and/or applications 104-2 have been published on one or more application server(s) 116. To publish an application 104-1 on an office computer 102, a user of the office computer 102 interfaces with RAP wizard 118 for personal publishing. The RAP wizard allows the user to specify the application to be published and generate map 120. Map 120 associates each office computer 102 to the specific user. Map 120 is subsequently utilized to provide the user with remote application discovery to published applications 104-1 for subsequent remote terminal server (TS) access by the user, as described below.

To publish an application 104-2 on an application server 116, an administrative entity uses a system policy editor or other administrative application to associate a specific user(s), group(s) of users, and/or remote client device(s) 106 to respective ones of the applications 104-2. The administrative entity uses the installation package installer (e.g., MSI) wizard 119 to generate an installation package (e.g., installation packages 121-1 through 121-3). An installation package 121 contains information about an application 104-2 sufficient to point to an installation point on one or more application servers 116. For instance, in one implementation, each installation package 121 specifies, a name of an application 104-2 and the name of the application server 116 (e.g., alias, IP address, etc.).

Installation packages 121, when associated with application(s) 104 published on an office computer 102 and/or application server(s) 116, may be stored on one or more databases (information sources). Any number of databases using any type of database access technology (e.g., LDAP, etc.) as a function of the specific architectural implementations of the LAN 112 can be used to store installation packages 121. In one implementation, installation package 121 is stored on a database as installation package 121-1 associated with a directory service 122 of a domain controller (not shown). In another implementation, installation package 121-1 is stored as installation package 121-2 on database 126 managed via Systems Management Server (SMS) 128. The directory service 122 and SMS 128 provide respective network services to identify LAN 112 resources, and make them accessible to users and applications.

For instance, the directory service 122 includes per-user information such as the list of published applications 104, as well as other information, such as firewall 108 navigation configuration(s). Although application(s) 104 published on an office computer 102 may be stored on one or more databases, these office computer mappings 120-1 may also be stored only on the associated office computer 102.

The RAP Web Server Service

Referring to FIG. 1, RAP Web server 114 aggregates terminal services remote application information/shortcuts from multiple sources so that they can be enumerated by a user of a remote client device 106 over the Internet. To this end, the RAP Web server 114 includes RAP Web service (RWS) 130 for receiving a discovery request 132 from a remote client device 106, for instance using Simple Object Access Protocol (SOAP)—a known lightweight protocol intended for exchanging structured information in a distributed environment. Since the discovery request 132 communicated to the RWS 130 via SOAP, the remote client 106 does not need to establish a Virtual Private Network (VPN) connection to the LAN 112 to obtain results of discovery request 132, as described below.

In this implementation, the RWS 130 utilizes an Internet Information Server (not shown) for services such as authentication, threading, and HTTP handling.

Responsive to receiving the remote application discovery request, the RWS 130 interfaces with each of multiple possible intranet remote application information source accessor modules 134 (e.g., modules 134-1 through 134-3) to generate an aggregate list of discovered remote applications (aggregate list 136). Each accessor module 134-1 through 134-3 is designed to interface with a particular type of data source, or database via implemented application programming interfaces (APIs) and sequences of operation configured to communicate with the particular data source. There may be any number of accessor modules 134 as a function of the desired deployment of application(s) 104 for Internet TS-access, and as a function of the particular architectural implementation of the LAN 112.

In this manner, an administrator of LAN 112 can use any number and combination of methods to publish applications 104. For example, in a corporate environment, an administrator may choose to use Software Update Services (SUS) technology in conjunction with a directory service 122 to publish applications 104. Another method could be Systems Management Server (SMS). In a Roaming environment, a user could publish his applications to a central location on a personal office computer 102, or could simply use a corporate identity to publish applications in a directory service 122. In a home environment, a home-user could publish applications using a known service bus technology.

In this implementation, for example, accessor modules 134 include SMS accessor 134-1, directory service accessor 134-2, and workstation accessor 134-3. The SMS accessor 134-1 sends a get applications request 138 ("request") to the SMS Server 128, for example, via HTTP. Responsive to receiving a get request 138, the SMS server evaluates mapping 120-3 to determine whether the user of the remote client 106 is associated with any applications 104 deployed within the domain of the SMS server 128. If so, the SMS server sends a get application response 140 ("response") identifying the associated application(s) 104 and their respective installation point(s)—e.g., computer(s) 102, application server(s) 116, etc.—back to the SMS accessor, which in turn, returns the response 140 to the Web service 130.

In one implementation, a remote application discovery response 140 is a text file (e.g., XML, RDP, and/or the like) including parameters that are useful to determine where the actual application 104 resides. Such parameters include, for example, a server name, an application path, redirection settings, file extensions associated with the remote application 104, etc.

For purposes of simplicity of discussion and representation, a single get application(s) request 138 and a single get application response 140 is shown. That is, single request 138 and single response 140 represent respective get requests and responses from respective ones of the accessor modules 134, although separate get requests 138 and get responses 140 showing a respective get application request and get application response from each type of accessor module 134 could also have been shown.

In this implementation, directory service accessor (DSA) 130-2 interfaces with the directory service 122, which in this example, is Active Directory®. The DSA sends a respective get applications request 138 to the directory service 122, for example, using LDAP—a common protocol for interfacing with a directory service. Responsive to receiving request 138, the directory service evaluates installed application-to-user mapping 120. This evaluation determines whether the user of the remote client device 106 is authorized/associated with specific ones of the applications 104. Results of this evaluation, including respective installation point(s) of any such applications 104, are returned to the Web service 130 by the directory service 122 as a respective response 140.

Personal computer (PC) accessor 134-3 enumerates applications 104-1 installed for Internet-based remote application discovery on an office computer 102 on LAN 112. To this end, PC accessor 134-3 identifies the Intranet address of the office computer 102—the office computer having been assigned to the user of the remote computing device 106. To this end, the PC accessor 134-3 communicates a get resource request 139 to directory service 122. The get resource request 139 indicates corporate identity of the user; the corporate identity being set-up in advance by an administrative entity on LAN 112 and subsequently determined by RAP setup module 148, as described in greater detail below. Responsive to receiving the get resource request 139, the directory service identifies the Intranet address (not shown) of the user's office computer 102 (e.g., an IP address, NAT-based address, alias, and/or the like). The directory service communicates the network address back to the PC accessor module 134-3.

In one implementation, the remote computing device 102 of the user is not connected or otherwise "tunneled" (via a VPN connection) into the Intranet of LAN 112 when the get resource request 139 is communicated the directory service 122. Instead, the RWS 130 acts as an intermediary by communicating with directory service 122. In this implementation, the get resource request 139 may be communicated via LDAP, or some other appropriate protocol.

Responsive to receiving the Intranet address of the user's office computer 102, PC accessor 134-3 sends a respective get applications request 138 to RAP Web service 142—the RAP Web service 142 is deployed on the user's office computer 102. In one implementation, the get applications request 138 is communicated via SOAP.

Responsive to receiving a respective get application(s) request 138, Web service 142 interfaces with directory services 122 to retrieve information associated with the application(s) 104 installed on LAN 112 that correspond to the user's office computer. Web service 142 interfaces with shell accessor 144 to identify installed application(s) 104-1 on the desktop/shell of the user's office computer 102. Techniques for identifying applications installed on a computer, for instance, via an operating system service, are known. This information includes respective installation point(s) of any such applications 104-1 installed on the user's desktop/workspace and any information needed to execute the application(s) via a TS client session with the remote client device 106. This information is returned to RWS 130 by the directory service 122 as a respective get application(s) response 140.

RAP Web service (RWS) 130 receives response(s) 140 from respective ones of the accessor module(s) 134. The RWS 130 generates aggregate list 136 from the data included in the received response(s) 140. RWS 130 sends aggregate list 136 to the remote client device 106 that initiated the remote application discovery request 132. In one implementation, the aggregate list is communicated to the remote client device 106 via SOAP/HTTP. Additionally, although list 136 is referred to as an aggregate list, the respective get application responses 140 need not be combined to form an aggregate, but might also be communicated as list(s) 140 comprising discovered installed application(s) 104 information from one or more the data sources (e.g., server(s), office computer(s), and/or the like).

Figure 2:
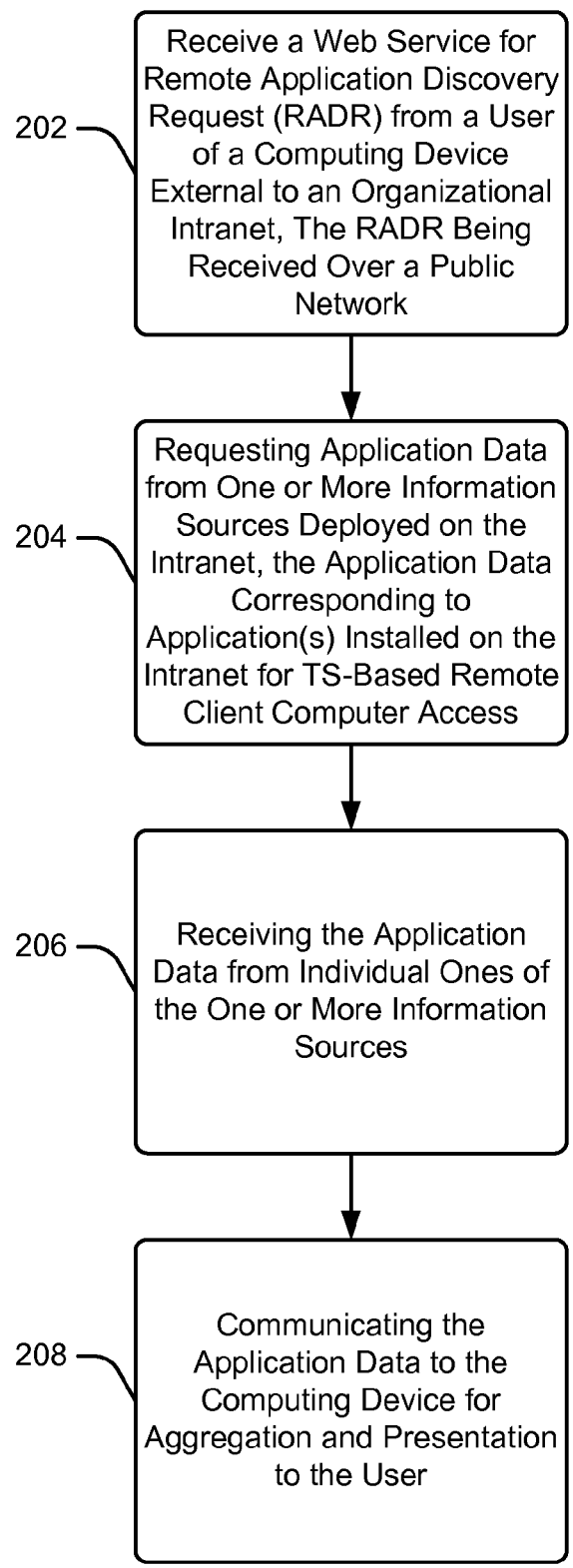
FIG. 2 shows an exemplary procedure for a public network service for remote application discovery.

FIG. 2 shows an exemplary procedure 200 for a public network service for remote application discovery. For purposes of discussion and illustration, the operations of FIG. 2 are described with respect to corresponding components of FIG. 1. (In the figures, the left-most digit of a component reference number identifies the particular figure in which the component first appears.)

At block 202, a remote application discovery request (RADR) 132 (FIG. 1) is received by the RAP Web Server (RWS) 130 from a remote client computing device 106. As described above, the RWS 130 is located in an Intranet such as LAN 112. The remote client computing device 106 is external to the LAN 112. For instance, in one implementation, the remote client 106 is coupled to the RWS 130 across a public external network 113 such as the Internet.

At block 204, the RWS 130 requests application data from one or more information sources deployed on the Intranet. Such a request may be made via respective message(s) 138. In one implementation, the RWS 130 send one message 138 to each respective data source. The application data corresponds to application(s) 104 installed and associated with the user of the remote computing device 106. The information sources include, for example, office computers 102, directory services 122, and/or SMS server 128.

In one embodiment, the remote application discovery request 132 indicates the one or more data sources of interest as well as a local login and/or a corporate identity of the user of the remote computing device 106. For instance, the request 132 may indicate that applications 104-1—those installed on an office computer 102 associated with the user—are to be discovered. A corporate identify corresponds to the user's identify on the LAN 112.

At block 206, the RWS 130 receives the requested application data, for instance, via respective response(s) 140 from respective ones of the data sources on the Intranet. At block 208, the RWS 130 communicates the application data (e.g., via message(s) 136) to the requesting client device 102, and in satisfaction of the remote application discovery request 132 sent to the RAP Web server 114.

We now describe exemplary aspects of the remote client computing device 106.

The Remote Client Device

The following described components allow remote client device 106 to automatically enumerate (via a public network) applications for remote access that are installed on the user's office computer 102 in the end-user's office on a private Intranet. In this embodiment, remote client computing device 106 ("remote client") includes wizard 146 for gathering user credentials (e.g., corporate identity), and using received configuration data to configure the remote client 106 for TS access and to initiate remote application discovery via the RWS 130. Wizard 146 provides roaming plug-in services for determination of a roaming knowledge worker environment. It communicates with the RAP Web service 130 to get the list of remote applications 104 published to the user. For instance, wizard 146 obtains user credentials for access to LAN 112. Wizard 146, via RAP setup module 148, sends these credentials to the RAP wizard 118 of the user's office computer 102. RAP wizard 118 sends these credentials to the remote client configuration (RCC) module 150 for verification of user access to the LAN 112 (e.g., via an enterprise authentication service). If the user is authorized to access LAN resources, the RAP wizard 118 communicates message 152 including LAN access authorization and a location of an outward-facing RAP Web server (RWS) 114 to RAP setup module 148.

Once the user of the remote client 106 has been authorized for LAN 112 access, wizard 146 sends discover remote applications request 132 to the RAP Web service (RWS) 130. As indicated above, the Internet address/URL of the RWS 130 is identified in the message 152 and/or identified in some other manner, such a via a configuration script executed on the remote client. As described above, responsive to receiving the discovery request, 132, the RWS 130 invokes one or more accessor 134 to interrogate respective data sources on the LAN to identify application(s) 104 associated or otherwise published for user TS access. The RWS returns this information to the wizard 146 as aggregated list 136.

Wizard 146 communicates aggregated list 136 to the RAP client worker 154, which takes newly discovered remote applications and presents them to the user, through shell 156. In one implementation, shortcuts 158 representing the applications 104 identified in the aggregated list 136 are presented to the user. In this example, each shortcut 158 is a file that points to a respective application 104 on an installation point of LAN 112. The shortcut(s) 158 allow a user to conveniently access files stored on the LAN 112 via TSs provided by TS client 160.

Rap spawner 162 component triggers TS client 160 when the user chooses to start an application 104 associated with a shortcut 158. When the RAP spawner is used, shell items (respective ones of shortcuts 158) are refreshed by shell component 156. For example, when a sub-component for the current environment determines that a remote application 104 has been unpublished or updated, it notifies the RAP client worker 154, and the RAP client worker 154 handles the deletion or update of desktop shortcuts on behalf of the sub-component.

Figure 3:
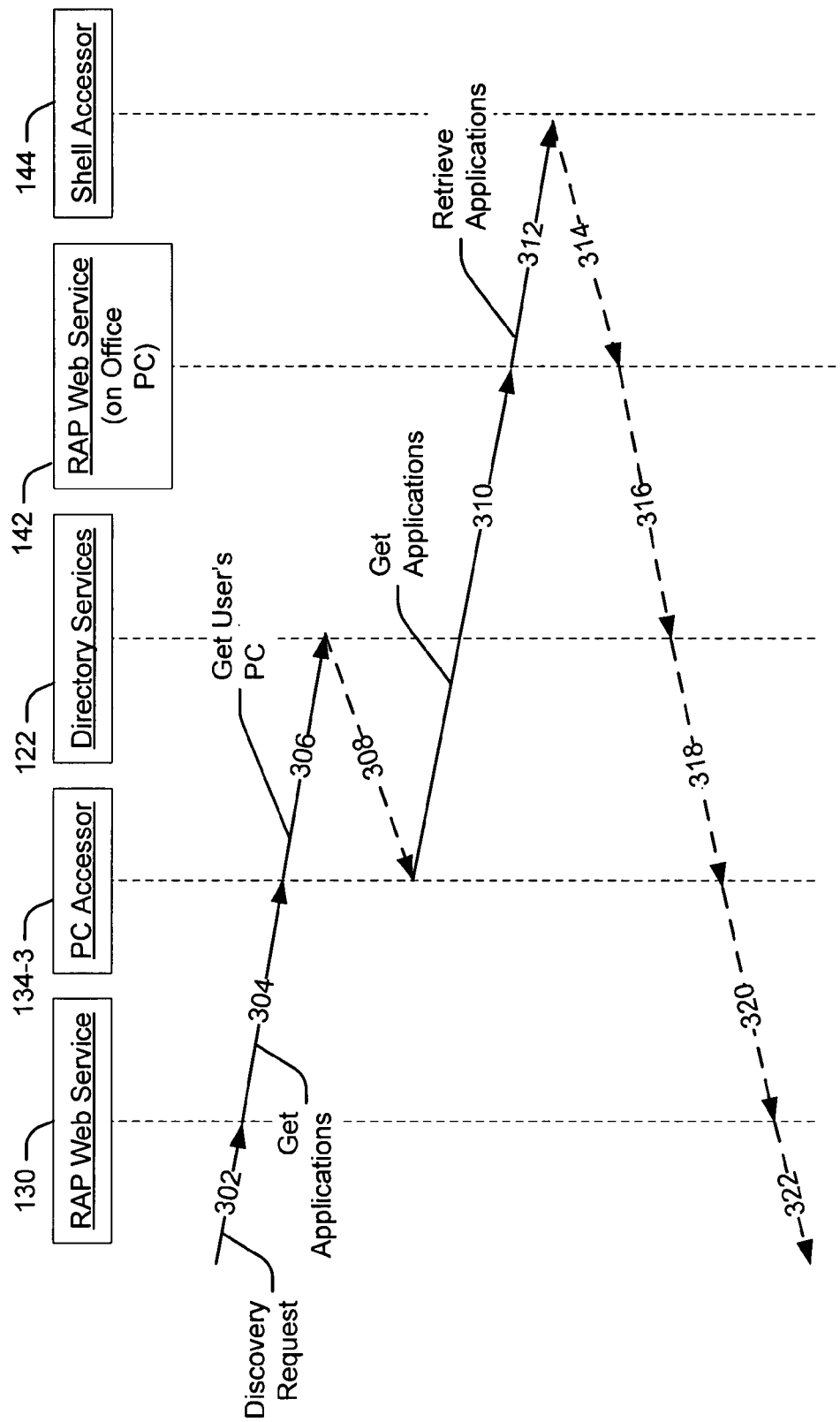
FIG. 3 shows exemplary component data flow for a remote client computer to discover remote applications installed on an office computer 102 in a local area network. The remote application discovery is accomplished via a Web service that is accessed via a public network such as the Internet.

FIG. 3 shows exemplary component data flow for a remote client computer 106 to discover remote applications 104-1 installed on an office computer 102 in a LAN 112. The remote application discovery is accomplished via a Web service that is accessed via a public network 113 such as the Internet. For purposes of discussion and illustration, the operations of FIG. 3 are described with respect to corresponding components of FIG. 1. In the figures, the left-most digit of a component reference number identifies the particular figure in which the component first appears. For instance, components 122, 130, 134-3, 142, and 144 were first introduced above with respect to FIG. 1. The vertical lines, which intersect respective ones of the components, are used to indicate receipt of certain messages and corresponding responses, as now described with respect to data flows 302-322, each of which are illustrated as directional arrows and each of which illustrate destination and/or origination to/from a particular component.

Directional arrow 302 shows a data flow to the RAP Web service 130. Data flow 302 corresponds to a request for remote application discovery. Remote application discovery request 132 of FIG. 1 is illustrative of such a request. In this example, the request indicates that applications 104-1, which are installed on a remote client computer 104 associated with a specified user, are of significance for discovery. Responsive to this request, and as shown by data flow 304, RAP Web server 130 communicates a respective get applications request 138 to an office computer accessor such as PC accessor 134-3. In this example, the get applications request does not identify the user's corresponding office computer 102. Thus, the PC accessor interrogates directory service 122 of LAN 112 for this user specific resource data-this is shown via data flow 306, which is directed to obtaining the network address for the user's computing device 102 via a Domain Name Service (DNS). This Intranet specific resource data is communicated back to the PC accessor 134-3 by the directory service 122 as shown by data flow 308.

At this point, the RAP Web service 130 has the network address associated with the user's computer device 102. Using this network address, the RAP Web service 130 of the RAP Web server 114 communicates a get applications request to RAP Web service 142—this Web service 142 is executing on the user's office computer 102. As shown by data flow 310, this get application request bypasses directory service 122. The Web service 142, responsive to receiving the request, interfaces with shell accessor 144, which is also executing on the user's office computer 102. This interface is represented by data flow 312. The shell accessor 133 determines if the user or other administrative entity has deployed any application(s) 104-1 on the computer 102 that have been marked for remote client Internet discovery and for subsequent TS execution. In one implementation, the shell accessor is a computer program provided by an operating system. The shell accessor 144 enumerates the application(s) 104-1 installed on the user's computing device 102, returning this information through respective ones of the components, as shown by data flows 314-320, eventually reaching the remote computing device 106, as shown by data flow 322.

Figure 4:
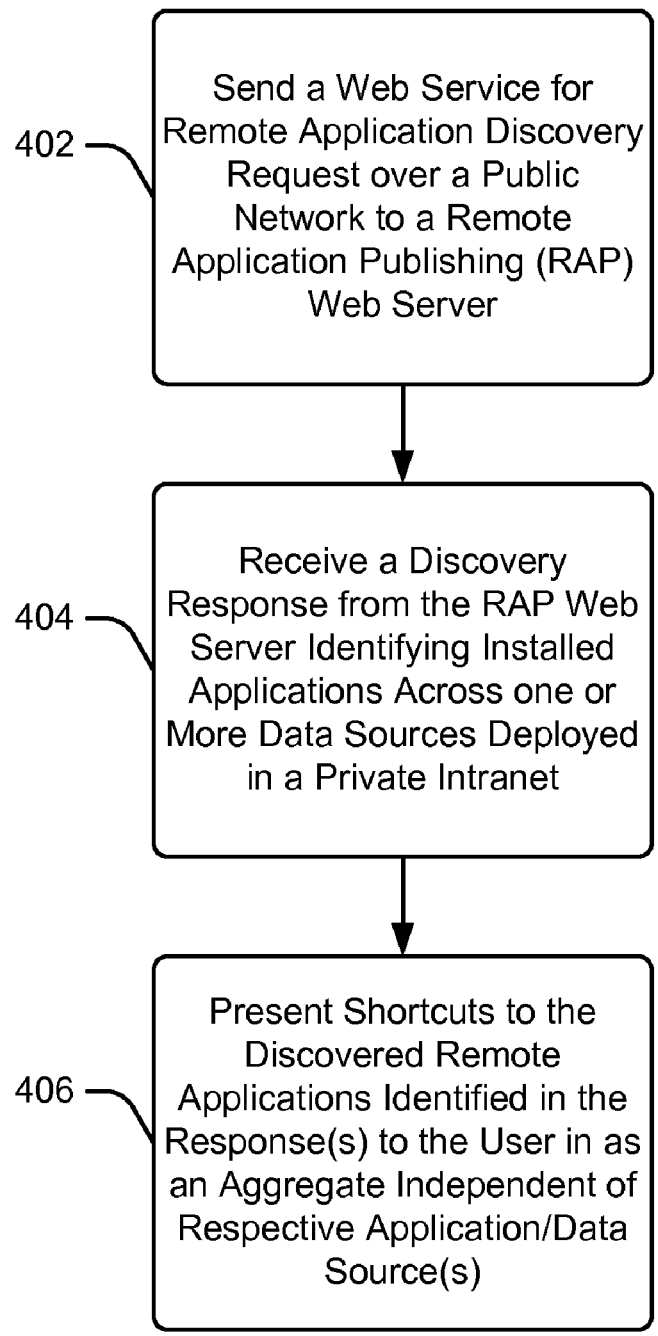
FIG. 4 shows an exemplary procedure to enumerate and present applications installed for terminal server access on an Intranet to a user of a client computing device that is external to the Intranet.

FIG. 4 shows an exemplary procedure 400 to enumerate and present applications installed for terminal server access on an Intranet to a user of a client computing device 102 that is external to the Intranet. For purposes of discussion, the operations of FIG. 4 are described with respect to corresponding components of FIG. 1. At block 402, the remote client computing device 102 sends a remote application discovery request 132 to the RAP Web server 130 of the RAP Web service 114. In one implementation, the request 132 indicates that the user of the remote client device 102 is interested in receiving information corresponding to applications 104 installed on one or more specific installation points across the LAN 112. That is, individual ones and/or types of data sources of interest may be specified in the remote application discovery request.

At block 404, the remote client device 102 receives a discovery response 136 from the RAP Web service 130 identifying the installed applications 104 across one or more data sources deployed in a private Intranet. Such data sources include, for example, user workstation(s) (e.g., office computer 102) and various installation points that may be accessed via a directory service 122, an SMS server 128, and or any other type of information source deployed on LAN 112.

At block 406, the remote client device 106 presents shortcuts 158 to these installed application(s) 104 to the user—the shortcuts are generated from information extracted from the one or more responses 136. The presentation of these discovered remote applications is seamless, meaning that shortcuts to respective ones of the application(s) 104 are presented independent of their respective data sources, for instance, on a desktop of the remote computing device 106, via a "start" menu, on a Web page accessed by the user via a browser 104, or in some other user interface. The seamless presentation represents a merged view that is presented to the end-user for all applications for which they have access, where these application may be associated with multiple network identities and may come from multiple different sources.

The user can select any of the presented shortcut(s) 158 to launch an associated application 104, remotely via known terminal services, for instance, via a TS Proxy (not shown) for receiving HTTP, converting it to a Remote Desktop Protocol (RDP), or equivalent, and forwarding to an appropriate terminal server (not shown) in LAN 112. Accordingly, when the application 104 executes on the remote installation point, the user experience is virtually identical to the experience had the application been installed locally at the remote client device 106 (e.g., there is full integration of audio, client-side printing devices, the taskbar, and so on).

In one implementation, the operations of block 406 are performed via respective interfaces between Wizard 146, RAP client worker 156, shell 156, and/or RAP spawner 162, as already described.

Exemplary Operating Environment

Figure 5:
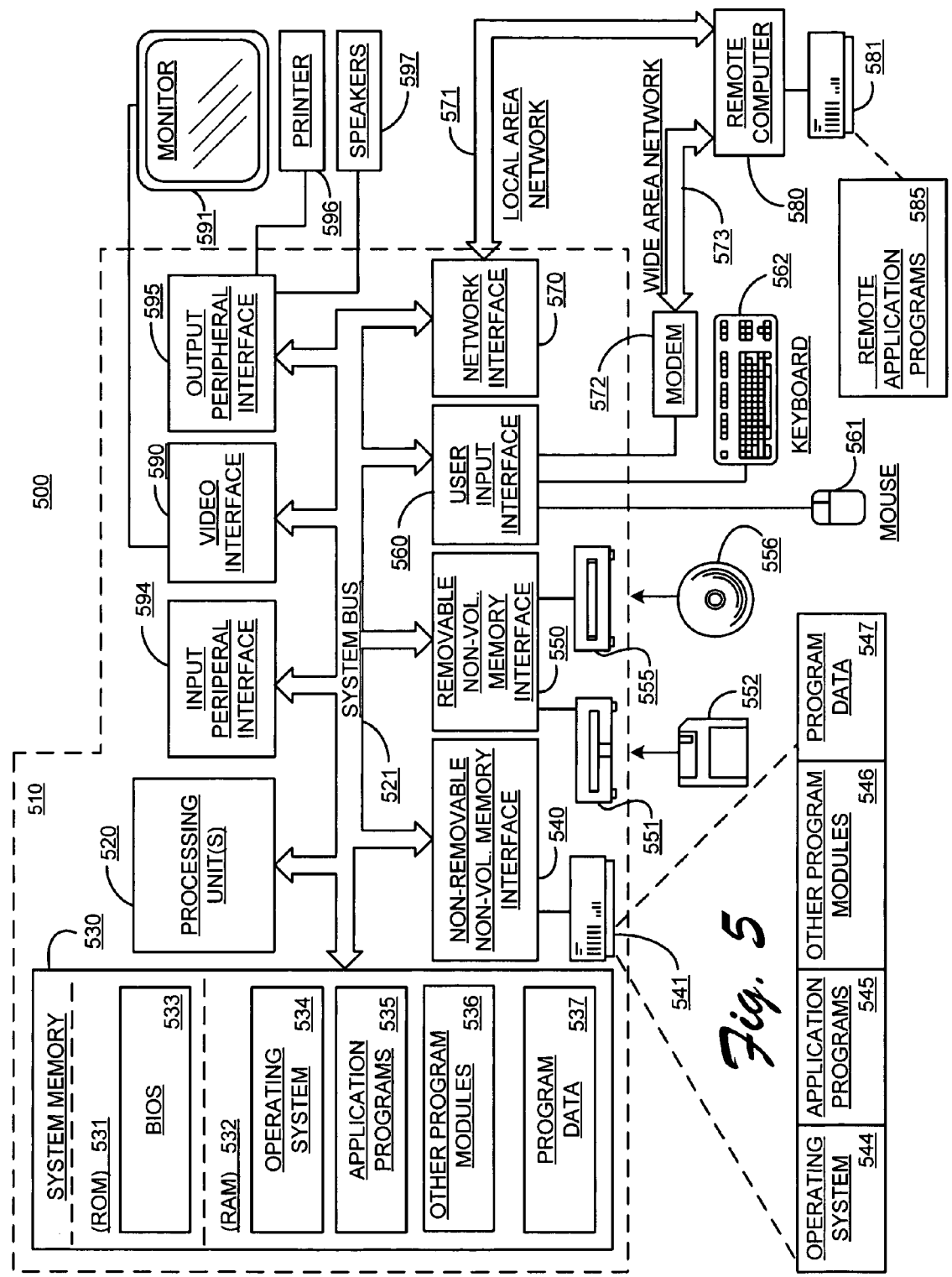
FIG. 5 illustrates an example of a suitable computing environment on which the subsequently described systems, apparatuses and methods or a Web service for remote application discovery may be implemented.

FIG. 5 illustrates an example of a suitable computing environment 500 on which the subsequently described systems, apparatuses and methods for a Web service for remote application discovery may be implemented (either fully or partially). Exemplary computing environment 500 is only one example of a suitable computing environment and is not intended to suggest any limitation as to the scope of use or functionality of systems and methods the described herein. Neither should computing environment 500 be interpreted as having any dependency or requirement relating to any one or combination of components illustrated in computing environment 500.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system for remote application discovery includes a general purpose computing device in the form of a computer 510. The following described aspects of computer 510 are exemplary aspects of the office computer 102 of FIG. 2, the RAP Web server 114 of FIG. 2, and/or the remote client computing device 106 of FIG. 2. In view of this, components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media.

Computer storage media includes volatile and nonvolatile, removable and non-removable media implemented in any method or technology for storage of information such as computer readable instructions, data structures, program modules or other data. Computer storage media includes, but is not limited to, RAM, ROM, LIEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that they are at least different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 operates in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. The network connections shown are exemplary and other means of establishing a communications link between the computers may be used.

Conclusion

Although the invention has been described in language specific to structural features and/or methodological operations or actions, it is to be understood that the invention defined in the appended claims is not necessarily limited to the specific features or actions described. Rather, the specific features and actions are disclosed as preferred forms of implementing the claimed invention.

The invention claimed is:

1. A method comprising:
   providing a Web service in an Intranet, the Web service being coupled to a public network;
   discovering, by the Web service, application information provided by one or more application information sources, the application information corresponding to at least one application deployed on the Intranet, the discovering comprising querying the one or more application information sources, the at least one application being configured for subsequent terminal server (TS) facilitated access by a user of a remote client computer, the remote client computer being external to the Intranet; and facilitating, by the Web service, the delivery of the discovered application information to the remote client computer.

2. A method as recited in claim 1, wherein the at least one application is one of multiple applications, respective ones of the multiple applications having been published by multiple information sources on the Intranet.

3. A method as recited in claim 1, wherein the at least one application is one of multiple applications, respective ones of the multiple applications having been published by multiple information sources on the Intranet, the multiple information sources comprising a directory service, a Systems Management Server (SMS), and/or an office computer associated with the user.

4. A method as recited in claim 1, wherein the remote client computer is not coupled to a public external network over a Virtual Private Network.

5. A method as recited in claim 1, wherein facilitating further comprises:
receiving, by the Web service, a remote application discovery request from the remote client computer, the remote application discovery request comprising identity information of the user, the remote application discovery request being communicated to the Web service across the public network;
responsive to receiving the remote application discovery request, communicating, by the Web service, a get applications request to one or more information sources deployed on the Intranet, the get applications request directing each of the one or more information sources to return the information as a function of the identity information;
responsive to the communicating, receiving the information; and
forwarding the information to the remote client computer for aggregated presentation of user interface objects associated with respective ones of remotely deployed applications that have been configured for subsequent TS-based access by the user.

6. A method as recited in claim 5, wherein the at least one application is installed on an office computer associated with the user, and wherein communicating the get applications request further comprises:
sending a get network address request to a directory service deployed on the Intranet;
responsive to sending the get network address request, receiving a response identifying a network address of the office computer; and
wherein the get applications request is communicated to the network address of the office computer.

7. One or more computer-readable storage media storing computer-executable instructions that, when executed on a processor, perform acts for remote application discovery, the acts comprising:
discovering, by a Web service, application information provided by an information source, the application information corresponding to at least one application deployed on the Intranet, the discovering comprising querying one or more application information sources, the at least one application being configured for subsequent terminal server (TS) facilitated access by a user of a remote client computer, the remote client computer being external to the Intranet; and
facilitating, by the Web service, the delivery of discovered information to the remote client computer.

8. The one or more computer-readable storage media as recited in claim 7, wherein the at least one application is one of multiple applications, respective ones of the multiple applications having been published by multiple information sources on the Intranet.

9. The one or more computer-readable storage media as recited in claim 7, wherein the at least one application is one of multiple applications, respective ones of the multiple applications having been published by multiple information sources on the Intranet, the multiple information sources comprising a directory service, a Microsoft Systems Management Server (SMS), and a local computer associated with the user.

10. The one or more computer-readable storage media as recited in claim 7, wherein the remote client computer is not coupled to a public external network over a Virtual Private Network.

11. The one or more computer-readable storage media as recited in claim 7, wherein the instructions for discovering further comprise instructions for:
receiving, by the Web service, a remote application discovery request from the remote client computer, the remote application discovery request comprising identity information of the user, the remote application discovery request being communicated to the Web service across the public network;
responsive to receiving the remote application discovery request, communicating, by the Web service, a get applications request to one or more information sources deployed on the Intranet, the get applications request directing each of the one or more information sources to return the information as a function of the identity information;
responsive to the communicating, receiving the information; and
forwarding the information to the remote client computer for aggregated presentation of user interface objects associated with respective ones of remotely deployed applications that have been configured for subsequent IS-based access by the user.

12. The one or more computer-readable storage media as recited in claim 11, wherein the instructions for communicating the get applications request to one or more information sources are implemented across respective ones of one or more accessor modules, each accessor module being configured to communicate with a particular one information source of the information sources.

13. The one or more computer-readable storage media as recited in claim 11, wherein the at least one application is installed on an office computer associated with the user, and wherein the instructions for communicating the get applications request further comprise instructions for:
sending a get network address request to a directory service deployed on the Intranet;
responsive to sending the get network address request, receiving a response identifying a network address of the office computer; and
wherein the get applications request is communicated to the network address of the office computer.

14. A computing device comprising:
a processor; and
a memory coupled to the processor, the memory comprising computer-program instructions executable by the processor for remote application discovery, the computer-program instructions, when executed by a computer, performs a method comprising:
providing a Web service in an Intranet, the Web service being coupled to a public external network;
discovering, by the Web service, application information provided by one or more information sources, the application information corresponding to at least one application deployed on the Intranet, the discovering comprising querying all application information sources on the intranet, the at least one application being configured for subsequent terminal server (TS) facilitated access to an application hosting server for a user of a remote client computer, the remote client computer being external to the Intranet; and
facilitating by the Web service, the delivery of discovered information to the remote client computer.

15. A computing device as recited in claim 14, wherein the at least one application is one of multiple applications, respective ones of the multiple applications having been published by multiple information sources on the Intranet.

16. A computing device as recited in claim 14, wherein the at least one application is one of multiple applications, respective ones of the multiple applications having been published by multiple information sources on the Intranet, the multiple information sources comprising a directory service, a Systems Management Server (SMS), and/or an office computer associated with the user.

17. A computing device as recited in claim 14, wherein the remote client computer is not coupled to the public external network over a Virtual Private Network.

18. A computing device as recited in claim 14, wherein the instructions for discovering further comprise instructions for:
receiving, by the Web service, a remote application discovery request from the remote client computer, the remote application discovery request comprising identity information of the user, the remote application discovery request being communicated to the Web service across the public network;
responsive to receiving the remote application discovery request, communicating, by the Web service, a get applications request to one or more information sources deployed on the Intranet, the get applications request directing each of the one or more information sources to return the information as a function of the identity information;
responsive to the communicating, receiving the information; and
forwarding the information to the remote client computer for aggregated presentation of user interface objects associated with respective ones of remotely deployed applications that have been configured for subsequent TS-based access by the user.

19. A computing device as recited in claim 18, wherein the instructions for communicating the get applications request to one or more information sources are implemented by respective ones of one or more accessor modules, each accessor module being configured to communicate with a particular one information source of the information sources.

20. A computing device comprising:
means for providing a Web service in an Intranet, the Web service being coupled to a public network;
means for discovering, by the Web service, information corresponding to at least one application deployed on the Intranet, the application being configured for subsequent terminal server (TS) based access for a user of a remote client computer, the remote client computer being external to the Intranet; and
facilitating by the Web service, the delivery of discovered information to the remote client computer.

21. A computing device as recited in claim 20, wherein the at least one application is one of multiple applications, respective ones of the multiple applications having been published by multiple information sources on the Intranet.

22. A computing device as recited in claim 20, wherein the at least one application is one of multiple applications, respective ones of the multiple applications having been published by multiple information sources on the Intranet, the multiple information sources comprising a directory service, a Systems Management Server (SMS), and/or an office computer associated with the user.

23. A computing device as recited in claim 20, wherein the means for discovering further comprise:
means for receiving, by the Web service, a remote application discovery request from the remote client computer, the remote application discovery request comprising identity information of the user, the remote application discovery request being communicated to the Web service across the public network;
responsive to receiving the remote application discovery request, means for communicating, by the Web service, a get applications request to one or more information sources deployed on the Intranet, the get applications request directing each of the one or more information sources to return the information as a function of the identity information;
responsive to the communicating, means for receiving the information; and
means for forwarding the information to the remote client computer for aggregated presentation of user interface objects associated with respective ones of remotely deployed applications that have been configured for subsequent TS-based access by the user.

* * * * *

UNITED STATES PATENT AND TRADEMARK OFFICE
CERTIFICATE OF CORRECTION

PATENT NO. : 7,720,906 B2
APPLICATION NO. : 10/721514
DATED : May 18, 2010
INVENTOR(S) : Tad Dennis Brockway et al.

It is certified that error appears in the above-identified patent and that said Letters Patent is hereby corrected as shown below:

In column 11, line 6, delete "LIEPROM," and insert -- EEPROM, --, therefor.

In column 14, line 44, in Claim 11, delete "IS-based" and insert -- TS-based --, therefor.

Signed and Sealed this
Fifteenth Day of February, 2011

David J. Kappos
*Director of the United States Patent and Trademark Office*